United States Patent [19]
Weiss

[11] 3,823,307
[45] July 9, 1974

[54] HEATING VESSELS

[75] Inventor: Robert Weiss, Sursee, Switzerland

[73] Assignee: Sursee-Werke AG, Sursee, Switzerland

[22] Filed: Apr. 26, 1973

[21] Appl. No.: 354,533

[30] Foreign Application Priority Data
May 9, 1972  Switzerland.................... 6859/72

[52] U.S. Cl................ 219/439, 165/32, 165/105, 219/326, 219/401, 219/430
[51] Int. Cl............................................ F27d 11/02
[58] Field of Search .......... 219/326, 401, 430, 431, 219/439, 440, 441, 530; 165/32, 105

[56] References Cited
UNITED STATES PATENTS

| 2,279,000 | 4/1942 | Larson | 219/439 |
|---|---|---|---|
| 3,327,772 | 6/1967 | Kodaira | 165/32 |
| 3,603,767 | 9/1971 | Scicchitano | 219/439 |
| 3,609,297 | 9/1971 | Christopoulos | 219/439 |
| 3,646,320 | 2/1972 | Rosatelli | 219/401 |
| 3,674,981 | 7/1972 | Pickard | 219/401 |
| 3,728,518 | 4/1973 | Kodaira | 219/326 |

FOREIGN PATENTS OR APPLICATIONS

| 192,806 | 11/1937 | Switzerland | 219/440 |
|---|---|---|---|
| 245,324 | 7/1947 | Switzerland | 219/430 |
| 78,404 | 1/1950 | Czechoslovakia | 219/439 |
| 258,804 | 5/1949 | Switzerland | 219/439 |
| 319,391 | 9/1929 | Great Britain | 219/439 |
| 529,997 | 9/1921 | France | 219/439 |

Primary Examiner—Volodymyr Y. Mayewsky
Attorney, Agent, or Firm—Finnegan, Henderson, Farabow and Garrett

[57] ABSTRACT

A closed heating system for heating vessel comprising a water reservoir located underneath the bottom of the vessel, a narrow conduit extending upwardly along the sides of the vessel to create a capillary action on the rising steam and prevent air-steam mixing in the conduit, a steam-air separation chamber connected to the top of the conduit for trapping air in the system and condensing the steam, and a condensate return conduit for returning condensed steam to the reservoir.

9 Claims, 10 Drawing Figures

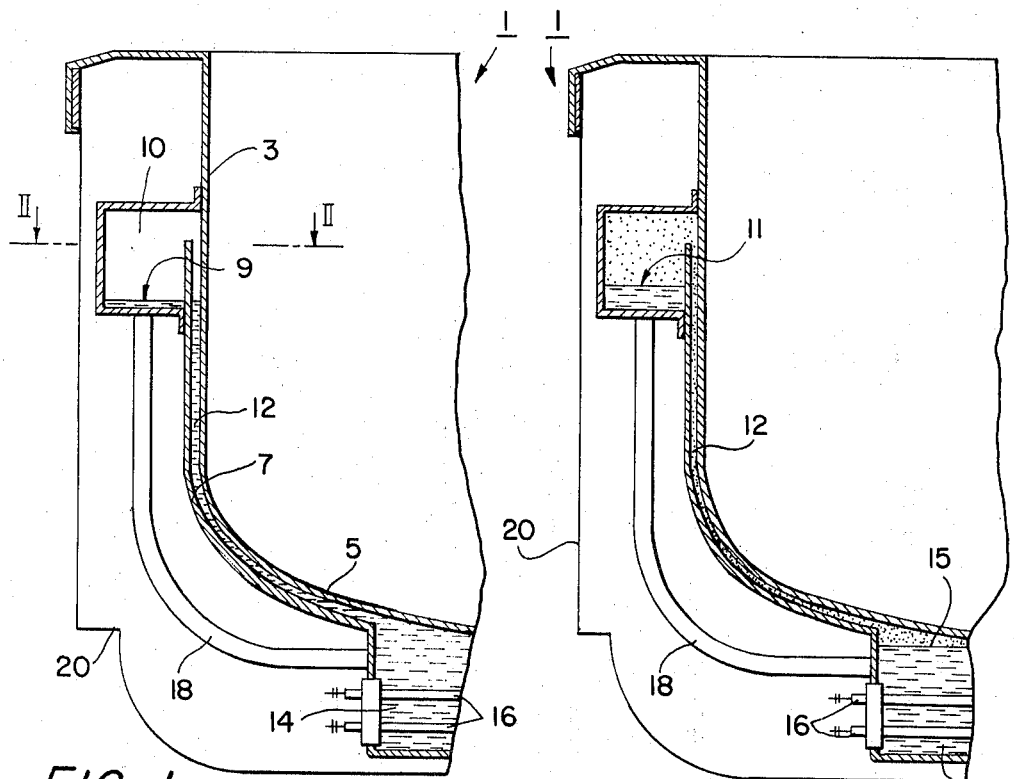
FIG. 1
FIG. 3
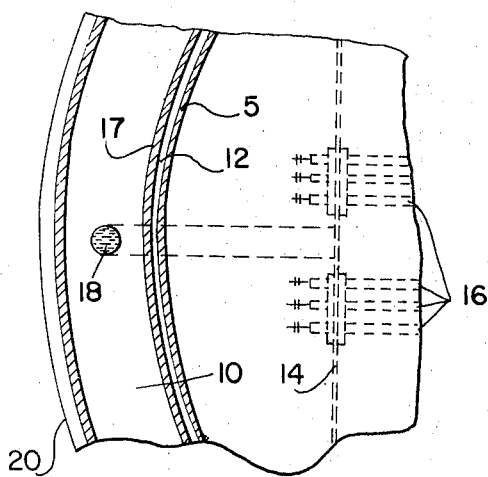
FIG. 2

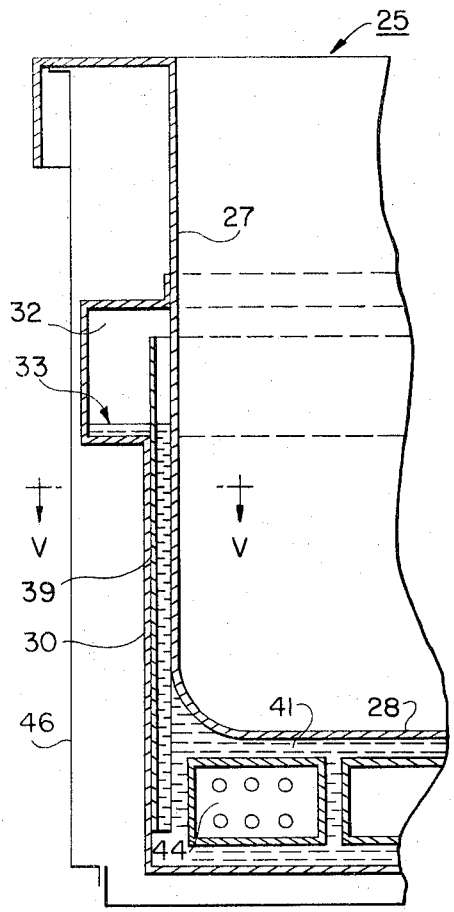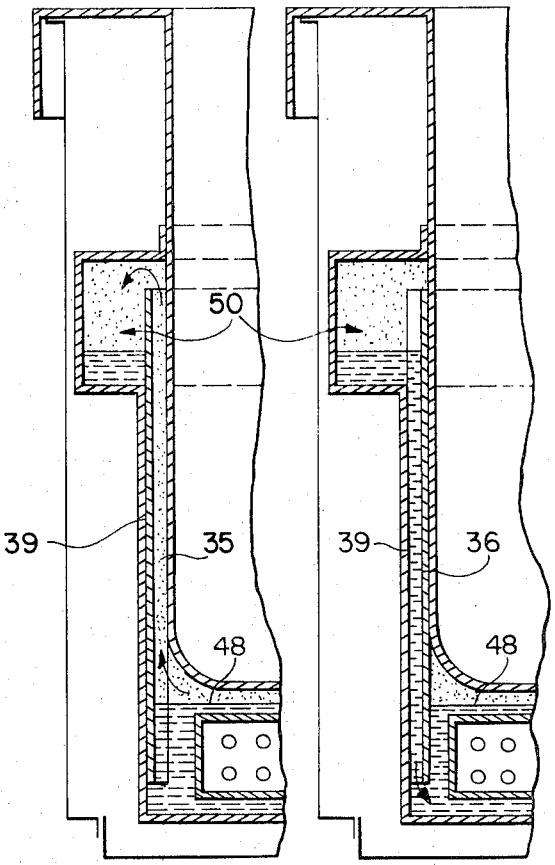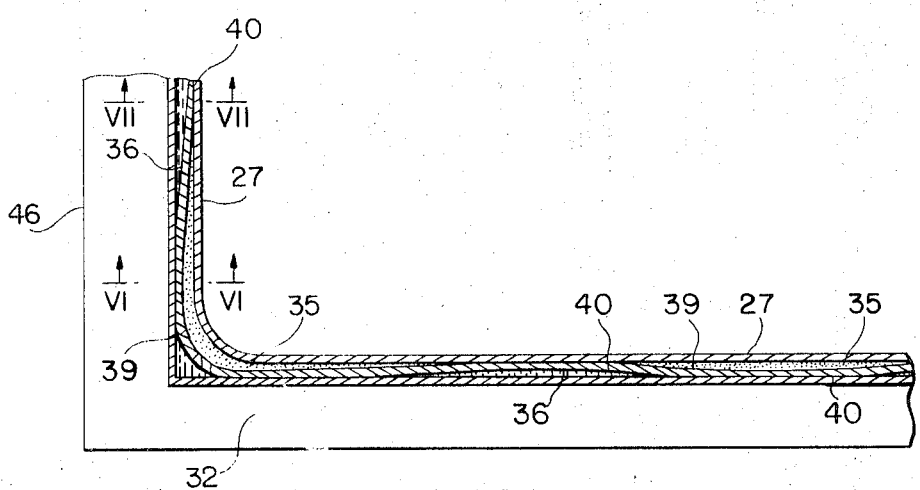

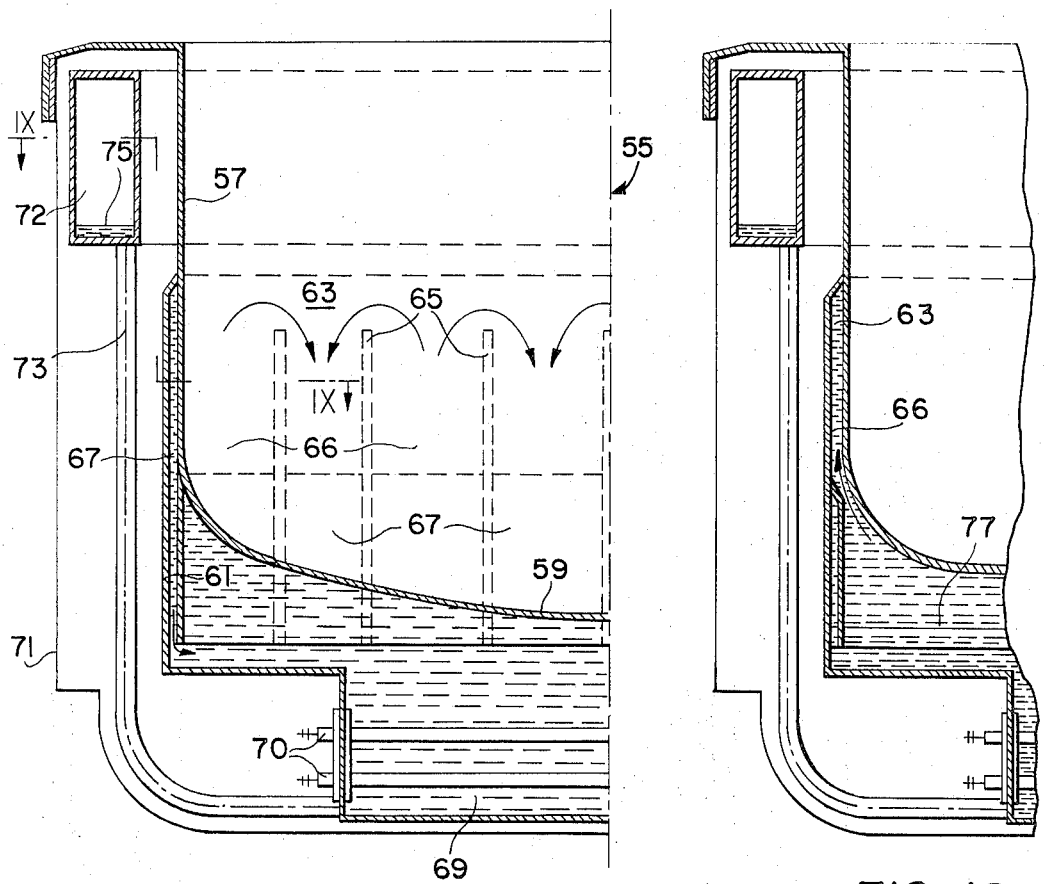
FIG. 8
FIG. 10
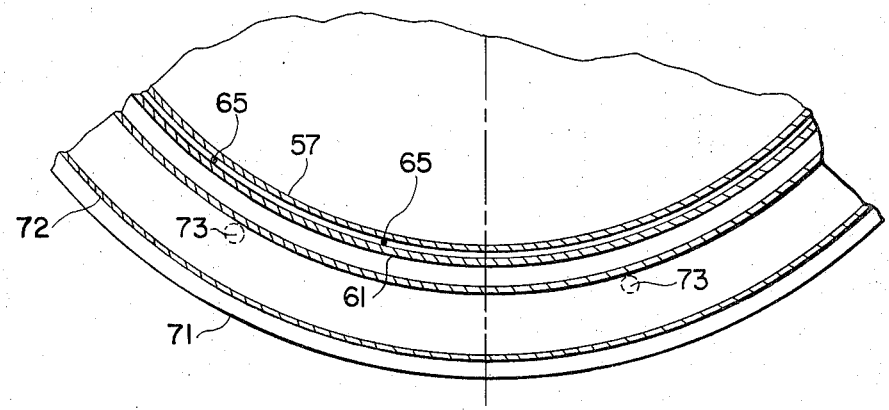
FIG. 9

HEATING VESSELS

The present invention relates to a heating vessel, and in particular to boilers equipped with dual linings operating at over-pressure, in which the lining is partly filled with water, and a heating system for bringing the water to a boil.

A certain length of time is considered customary in the art as regards raising the temperature in a heating vessel. For example, to raise the temperature from about 10° C to the range of the boiling point, say, to 95° C at sea level, this duration is about 50 minutes and should not exceed 55 minutes. Presently, water is conventionally used as the heating medium, the water being heated, for instance, by means of electrical heating rods and the heat being transferred through the boiler wall to the material to be heated. Oil and the like may also be used in lieu of water as the heating medium. Furthermore, the heating system may be a closed one and operate at over-pressure, so that the boiling point in the heating system can be increased by the selected pressure as established by the vapor pressure curve.

Further, it has been found most important in both closed and open primary systems to ventilate air from the system when raising the temperature and to take in air during cooling, the former measure to achieve sufficiently high heat-transfer coefficients from the heating side to the vessel wall and the latter so that there will be no caving-in of the dual wall on account of under-pressure in the heating circuit. Water is constantly lost, however, as vapor during ventilation so that the vessels are provided with appropriate alarm and control devices meant to prevent lowering of the water level below a critical value. Such control and monitoring devices require careful maintenance, however, and often are not maintained in a large-scale kitchen.

The object of the present invention, therefore, is the elimination of those dangers and to achieve heating vessels much more insensitive to maintenance and handling than previously known ones of this kind and which, nevertheless, will meet the standards encountered in practice.

To achieve this object, the heating vessel of the present invention having side walls and a bottom wall provides a closed heating system for the vessel comprising a main reservoir for holding a supply of water as the heating medium, means for heating the water in the reservoir to produce steam, at least one narrow conduit connected to the reservoir and extending upwardly along the outer surface of the side walls of the vessel to create a capillary action on the rising steam and prevent air-steam mixing in the conduit, an air-steam separation chamber connected to the top of said conduit for trapping air in the system and permitting condensation of steam, and at least one return conduit connected between the separation chamber and the reservoir for returning condensed steam to the main reservoir.

The invention is described below and for illustrative purposes by means of various figures.

Shown schematically are:

FIG. 1, part of a longitudinal section through a vessel not in operation;

FIG. 2, a section along line II—II of FIG. 1;

FIG. 3, part of the vessel of FIG. 1, during operation;

FIG. 4, a representation similar to FIG. 1, for a polygonal vessel;

FIG. 5, a section through a vessel along the line V—V of FIG. 4;

FIG. 6, a section of the vessel during operation along the line VI—VI of FIG. 5;

FIG. 7, a representation similar to FIG. 6, along the line VII—VII of FIG. 5;

FIG. 8, a section of a circular vessel similar to FIG. 1, passing through a condensation-backflow conduit;

FIG. 9, a section through the vessel of FIG. 8 along the line IX—IX; and

FIG. 10, a section similar to FIG. 8, passing through a steam conduit and during operation.

A round boiler 1 with side wall 3 and bottom wall 5 is shown in FIGS. 1 through 3. A dual lining 7 further may be noted, which becomes a steam-air separation chamber 10 at its upper part and also acts as expansion chamber. When in operation, there will be a level 11 in this chamber 10 which is somewhat higher than level 9 of the quiescent state. Chamber 10 is connected with a water reservoir 14 via an annular steam conduit 12 of narrow width and acting as a capillary on the rising steam. As shown in the figures, water reservoir 14 is preferably located underneath bottom wall 5 of boiler 1. The steam conduit 12 is of a width less than 3 mm, and preferably 2 mm or less. When in operation, the water will be at level 15 in water reservoir 14, so that the heating rods 16 are wholly submerged. The heating rods 16 may be connected to a conventional source (not shown in the drawings) by conventional means (also not shown in the drawings) well known in the art. For example, in the case of electrical heating rods, properly insulated leads may extend through the outer lining of the vessel to a power source outside the vessel. A condensation return pipe 18 ends in water reservoir 14 below level 15. A vessel outer lining 20 forms the outer seal of the circular boiler 1.

When operating such a heating vessel, one encounters the problem of avoiding mixing steam with air on the primary or heating side of the system, such mixture, if occurring, inordinately reducing the amount of heat transferred to the boiler. One will, thus, find in the literature (for instance, *Physikalische Grundlagen der Chemie-Ingenieurtechnik*, p. 697, by Prof. Dr. Grassman) that the heat transfer coefficient on the secondary side, where, for example, water is used as the material to be heated, will fall between 515 and 3,000 kcal/m²h° C so long as it is not boiling or being stirred, whereas air with forced convection (10 m/sec) will have a corresponding value of the order of magnitude of 60 kcal/m²h° C. The values for free convection are about 10–20 kcal/m²h° C. This shows clearly that air strongly influences the heat transfer in the primary system and that, henceforth, air must be eliminated. Consequently, heat transfer coefficients must be achieved on the primary side which are high enough not to be affected by air. For air-free water boiling in the container, the heat-transfer coefficient magnitudes are of the order of 2,500 to 40,000 kcal/m²h° C, depending on the heat load of the thermally conducting intermediate surfaces, the lower value applying to a load of about 28,000 kcal/m²h and the upper value for a load of about 850,000 kcal/m²h. The heat transmission coefficient for vertical walls of 1 m height for condensing water vapor amounts to about 5,500 kcal/m²h° C, whereas the order of magnitude for drop-condensation of water vapor is as high as 85,000 kcal/m²h° C.

These numbers clearly show that, if a practically complete air-exhaustion occurs on the primary or heating side in the sense that the heat-releasing water vapor or steam cannot mix with air, then heat-transfer coefficients may be achieved on the primary side which will be somewhat higher than on the secondary side. Therefore, it should be feasible to make the heating time a function only of the secondary side if such exhausting is properly carried out in a primary system wholly sealed with respect to the outside, i.e., it should be easy to obtain optimum heat transfer coefficients.

Now, exhaustive tests, in accordance with the present invention, have clearly shown that steam or vapor flowing in relatively narrow tubes or slits will practically not mix with the air being present and, therefore, the previously mentioned known heat-transfer coefficients between steam and the heating surfaces bounding the same may be achieved. It is not certain whether the requirement is exclusively achieved by a minimum rate of steam rise or the prevention of turbulent conditions. Probably, both phenomena act simultaneously and lead to the astonishingly favorable results. The fact is that the herein developed and operational new primary heating system functions virtually free of air and that the air driven from the water and present in the system collects in the steam-air separation chamber 10, the air forming an air cushion there, while the steam condenses and returns to water reservoir 14 via condensing flow-back tube 18—there may also be several tubes distributed evenly or unevenly over the periphery. The difference between water level 11 in the steam-air separation chamber 10 and water level 15 in water reservoir 14, which occurs during operation, is a measure of the kinetic energy of the rising steam in steam conduit 12. The width of steam conduit 12 may not exceed 3 mm, and preferably should be 2 mm or less, the steam mixing with air for larger widths and the heat-transfer coefficients then rapidly decreasing on the primary heating side and falling to the order of magnitude of the secondary side, so that heat transfer would be appreciably reduced.

One may, therefore, achieve a sealed heating system from which neither water, nor water vapor, nor air may leak and in which, nevertheless, mixing of the heat-releasing steam with air may practically be avoided, so that primary heat-transfer coefficients may also be obtained which are at least of the order of magnitude of those for the secondary side where there is unstirred water. Operators, therefore, need not pay attention to the water content on the primary side, except for the over-pressure safety valve of that side, which allows escape leakage if the pressure control should fail.

FIGS. 4 through 7 illustrate the embodiment of a rectangular boiler 25 with side walls 27 and a bottom 28 and also with a dual lining 30. In this instance, too, provision is made for a steam-air separation chamber 32, the level of which prior to operation is shown by 33.

As shown particularly in FIG. 5, alternating narrow steam conduits 35 with capillary effects and similar condensate return flow conduits 36 are formed by means of an intermediate wall 39. The extent to which the rising steam will already condense in steam conduits 35 depends on the kind of operation. Some part, however, will condense when saturated, but not overheated, steam is being used. This condensate will flow back in the capillary steam conduit 35, and opposite the rising steam direction, downwards into water reservoir 41. FIG. 5 further shows separation regions 40, where intermediate wall 39 rests firmly against the side walls of the vessel. A heater made up of electrical heating rods 44 in this instance and providing the heat through the heating pipes to the water in the primary heating circuit ensures the proper heat supply. The heating rods 44 may be connected to a power source (not shown) by conventional means (also not shown) well known in the art as described above. Boiler 25 is surrounded by an outer lining 46. The figures show water level 48 in reservoir 41 during operation and water level 50 in separator 32 during operation. The previously described phenomena of air separation and heat transfer coefficients on the primary side occur in this instance, too.

FIGS. 8 through 10 show another embodiment in which a circular boiler 55 is provided having a side wall 57, bottom wall 59, and a dual lining 61. Here, again, there is a steam-air separation chamber 63, the conduits being kept apart from one another by means of baffles 65 as regards steam and air rises and return flows of condensates, so that steam conduits 66 with capillary effects and similar condensate backflow conduits 67 are achieved. Here, again, the maximum width of the steam conduits is 3 mm, preferably 2 mm or less, as also was the case for the steam conduits 35 of the embodiment of FIGS. 4 through 7, such "capillary" dimension, however, being required to be less than the entire conduit height.

A water reservoir 69 located underneath boiler 55 is provided with heating rods 70, connected to a conventional source (not shown) by conventional means (also not shown), and boiler 55 as a whole is wrapped by an outer lining 71. An expansion chamber 72 with an expansion conduit 73 is located between inner wall 57 and outer lining 71, expansion conduit 73 absorbing water expansion and expansion of air in the primary circuit during operation. Operational level 75 in expansion chamber 72 and operational level 77 in water reservoir 69 are also shown. This embodiment, too, operates on the previously mentioned principle and here, too, some amounts of the steam condense in steam conduits 66 flowing directly back into water reservoir 69.

By means of this invention, one may achieve a practically fool-proof sealed primary heating system with good separation of steam and air and, hence, good boiling properties in the boilers operating under over-pressure in the primary system.

The invention in its broader aspects is not limited to the specific details shown and described and departures may be made from such details without departing from the principles of the invention and without sacrificing its chief advantages.

What is claimed is:

1. A heating vessel having thermally conductive inner side walls, a thermally conductive bottom wall, a thermally non-conductive outer lining extending around and lying adjacent the outer surface of the side walls closed at the top and defining a closed cavity between the bottom and side walls and the outer lining, and a closed heating system for the vessel housed within the closed cavity, said closed heating system comprising a main reservoir for holding a supply of water as the heating medium, heating means in said cavity for heating the water in the reservoir to produce steam, at least one narrow conduit connected to the reservoir and extending upwardly along the outer surface of the side walls of the vessel, the conduit passage being sufficiently narrow so as to create a capillary effect on the rising steam and prevent air-steam mixing in the conduit, an air-steam separation chamber connected to the top of the steam conduit for collecting and trapping air in the system and permitting condensation of the steam, and at least one return conduit connected between the separation chamber and the reservoir for returning the condensed steam to the main reservoir.

2. The heating vessel of claim 1, further including an expansion chamber in the heating system for absorbing air and water expansion during heating.

3. The heating vessel of claim 2, wherein the steam-air separation chamber also serves as the expansion chamber.

4. The heating vessel of claim 2, wherein the expansion chamber is separate from the steam-air separation chamber.

5. The heating vessel according to claim 1, wherein the width of the steam conduit passage is less than about 3 mm.

6. The heating vessel according to claim 1, wherein the steam conduit comprises a narrow, annular conduit extending upwardly around the side walls of the vessel and forming a double lining for the vessel.

7. The heating vessel of claim 1, including a plurality of spaced baffles located within the space between the outer lining and the side walls, said baffles defining alternately steam conduits and condensate return conduits between adjacent baffles, the adjacent conduits being interconnected at their tops by the air-steam separation chamber.

8. The heating vessel of claim 1, wherein the water reservoir is located underneath the bottom wall of the vessel.

9. The heating vessel of claim 1, wherein the heating means in said cavity comprises electrical heating rods.

* * * * *